United States Patent
Chiu et al.

(10) Patent No.: US 11,174,957 B1
(45) Date of Patent: Nov. 16, 2021

(54) ADJUSTABLE VENTURI TUBE

(71) Applicant: CASHIDO CORPORATION, Miaoli County (TW)

(72) Inventors: Chun-Lung Chiu, Miaoli County (TW); Yung-Chih Lee, Miaoli County (TW)

(73) Assignee: CASHIDO CORPORATION, Miaoli County (TW)

( * ) Notice: Subject to any disclaimer, the term of this patent is extended or adjusted under 35 U.S.C. 154(b) by 0 days.

(21) Appl. No.: 17/141,323

(22) Filed: Jan. 5, 2021

(51) Int. Cl.
  *F16K 17/24* (2006.01)
  *F16K 31/12* (2006.01)

(52) U.S. Cl.
  CPC ............. *F16K 17/24* (2013.01); *F16K 31/12* (2013.01)

(58) Field of Classification Search
  CPC .................................. F16K 17/24; F16K 31/12
  See application file for complete search history.

(56) References Cited

U.S. PATENT DOCUMENTS

| | | | | |
|---|---|---|---|---|
| 5,427,151 A | * | 6/1995 | Pauley | B01F 5/0077 137/505.25 |
| 8,905,079 B2 | * | 12/2014 | Bonoz | B01F 5/043 137/893 |
| 8,925,443 B2 | * | 1/2015 | Agarwal | B01F 13/002 99/323.1 |
| 9,205,385 B2 | * | 12/2015 | Sabadicci | B01F 5/0428 |

* cited by examiner

*Primary Examiner* — Eric Keasel
(74) *Attorney, Agent, or Firm* — Li & Cai Intellectual Property (USA) Office

(57) ABSTRACT

An adjustable Venturi tube is provided and includes a water outlet segment and a water inlet segment. The water outlet segment has a gas inlet space therein and includes a chamber, a water flow selector disposed on the chamber, and a gas inlet pipe. The chamber has a gas inlet opening and a plurality of liquid-gas exits, which are in spatial communication with the gas inlet space. The water flow selector has a plurality of selective channels respectively facing the liquid-gas exits. The water outlet segment has a space and a water channel that is in spatial communication with the space. The water inlet segment and the water flow selector are configured to be moved relative to each other so as to allow the space to selectively be in spatial communication with at least one of the selective channels through the water channel.

10 Claims, 15 Drawing Sheets

ADJUSTABLE VENTURI TUBE

FIELD OF THE DISCLOSURE

The present disclosure relates to a Venturi tube, and more particularly to an adjustable Venturi tube.

BACKGROUND OF THE DISCLOSURE

An inner structure of a conventional Venturi tube does not have an adjustable function for outputting water or inputting gas, so that the conventional Venturi tube needs to take different forms to meet the requirements of different environments. In other words, the conventional Venturi tube is formed with different inner structures to be respectively applied in the different environments.

SUMMARY OF THE DISCLOSURE

In response to the above-referenced technical inadequacies, the present disclosure provides an adjustable Venturi tube to effectively improve on the issues associated with conventional Venturi tubes.

In one aspect, the present disclosure provides an adjustable Venturi tube, which includes a water outlet segment, a water inlet segment, and an inner gasket. The water outlet segment includes a water flow selector, a chamber, a water outlet pipe, and a gas inlet pipe. The water flow selector has a plurality of selective channels. The chamber has a bottom wall and a surrounding lateral wall connected to the bottom wall. The water flow selector is disposed on the chamber, and the water outlet segment has a gas inlet space therein. The surrounding lateral wall has a gas inlet opening that is in spatial communication with the gas inlet space, the bottom wall has a plurality of liquid-gas exits respectively corresponding in position to the selective channels. Each of the selective channels is spaced apart from the corresponding liquid-gas exit and is in spatial communication with the gas inlet space, and an inner diameter of each of the selective channels is less than an inner diameter of the corresponding liquid-gas exit. The water outlet pipe is connected to the bottom wall. The water outlet pipe is configured to be in spatial communication with the gas inlet space through any one of the liquid-gas exits and the corresponding selective channel. The gas inlet pipe is connected to the surrounding lateral wall. The gas inlet pipe is in spatial communication with the gas inlet space through the gas inlet opening. The water inlet segment includes a pipe body and an adjusting portion. The pipe body has a screwing portion arranged on an inner side of a top portion thereof. The adjusting portion is connected to an inner side of a bottom portion of the pipe body and has a water channel. The water inlet segment and the water flow selector are configured to be moved relative to each other so as to allow a space surrounded by the screwing portion to selectively be in spatial communication with at least one of the selective channels through the water channel. The inner gasket is fixed to the adjusting portion and surrounds the water channel. The inner gasket is gaplessly abutted against the water flow selector.

Therefore, since the adjustable Venturi tube of the present disclosure is formed with a specific structural design (e.g., the selective cooperation of the water channel and the selective channels), the adjustable Venturi tube under an environment with different water pressures can be maintained to intake gas by selecting a quantity of the selective channels cooperated with the water channel. Moreover, the adjustable Venturi tube of the present disclosure allows different water flows to pass therethrough so as to have a multi-flow adjustment function for satisfying environments with different water flows or different gas flows.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
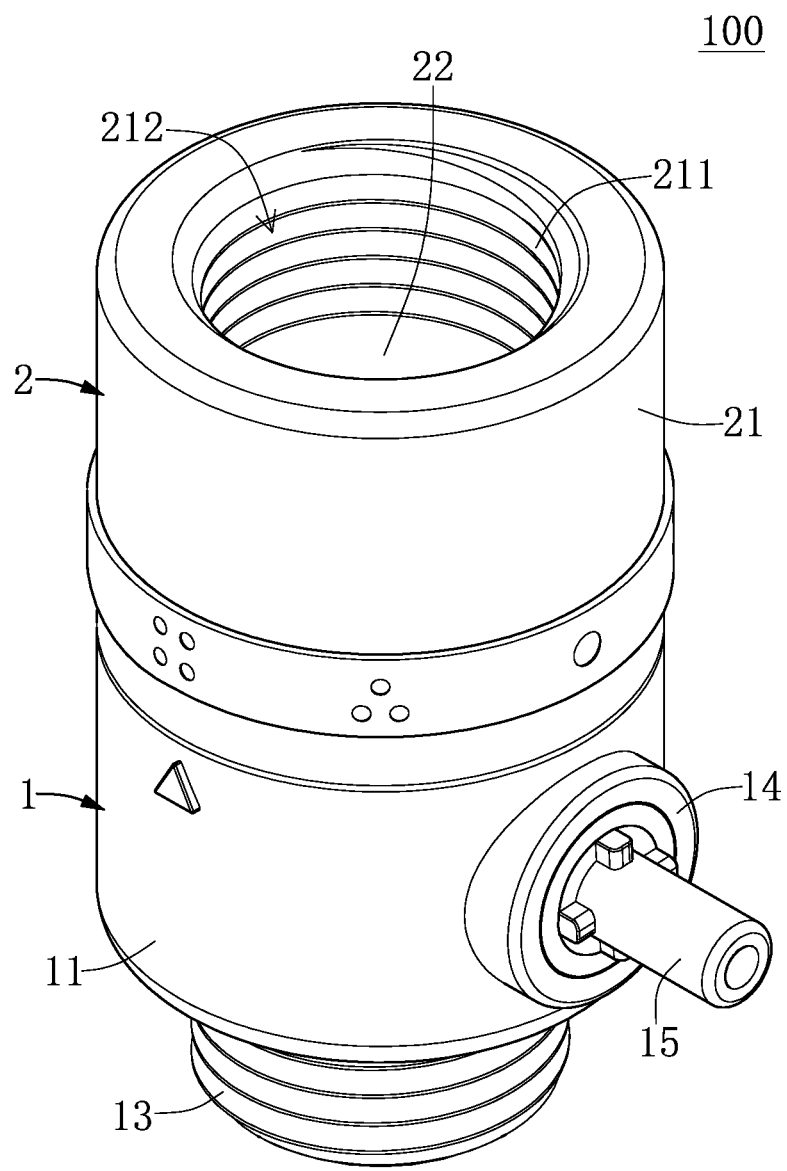
FIG. 1 is a perspective view of an adjustable Venturi tube according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
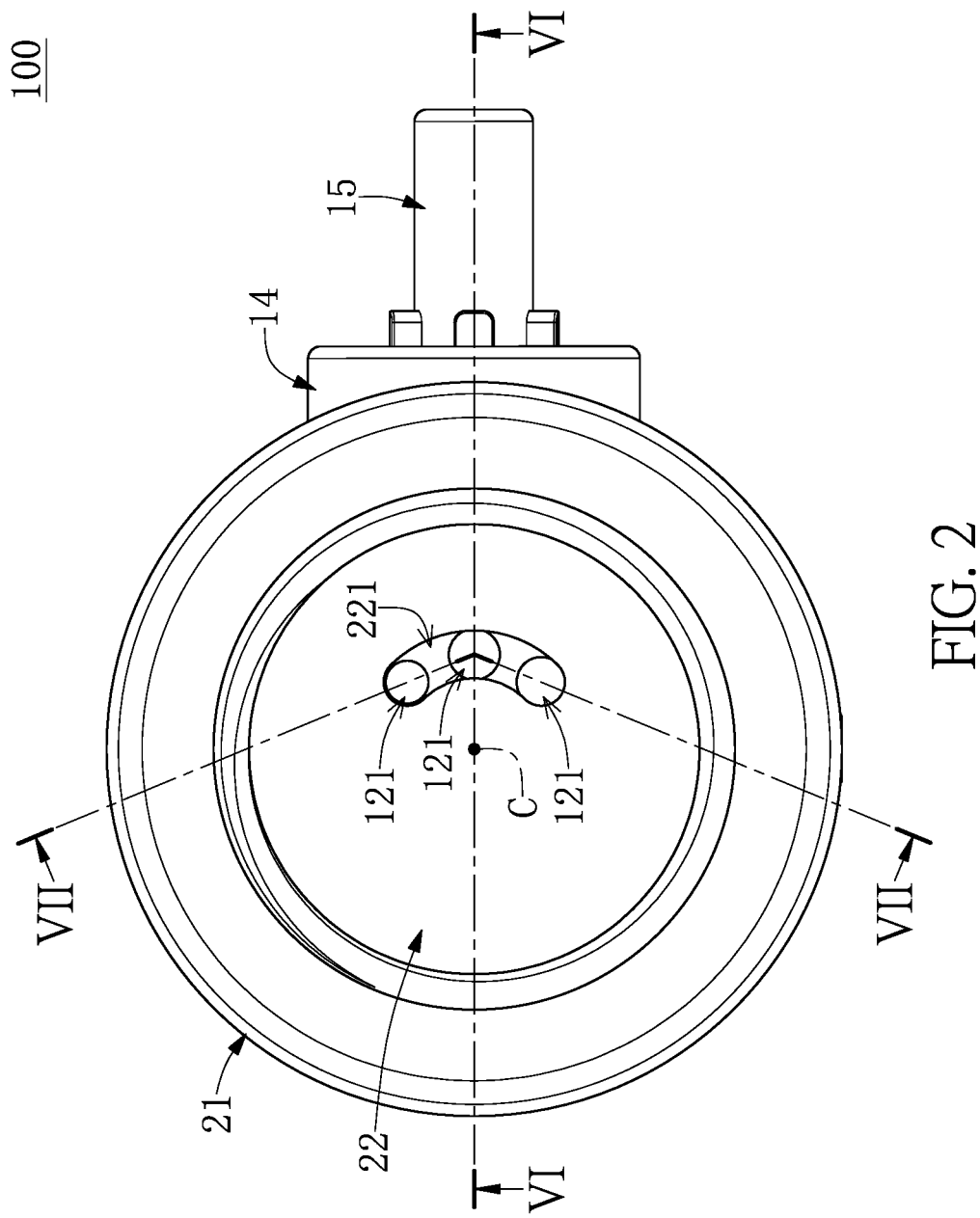
FIG. 2 is a top view of FIG. 1.
Figure 3:
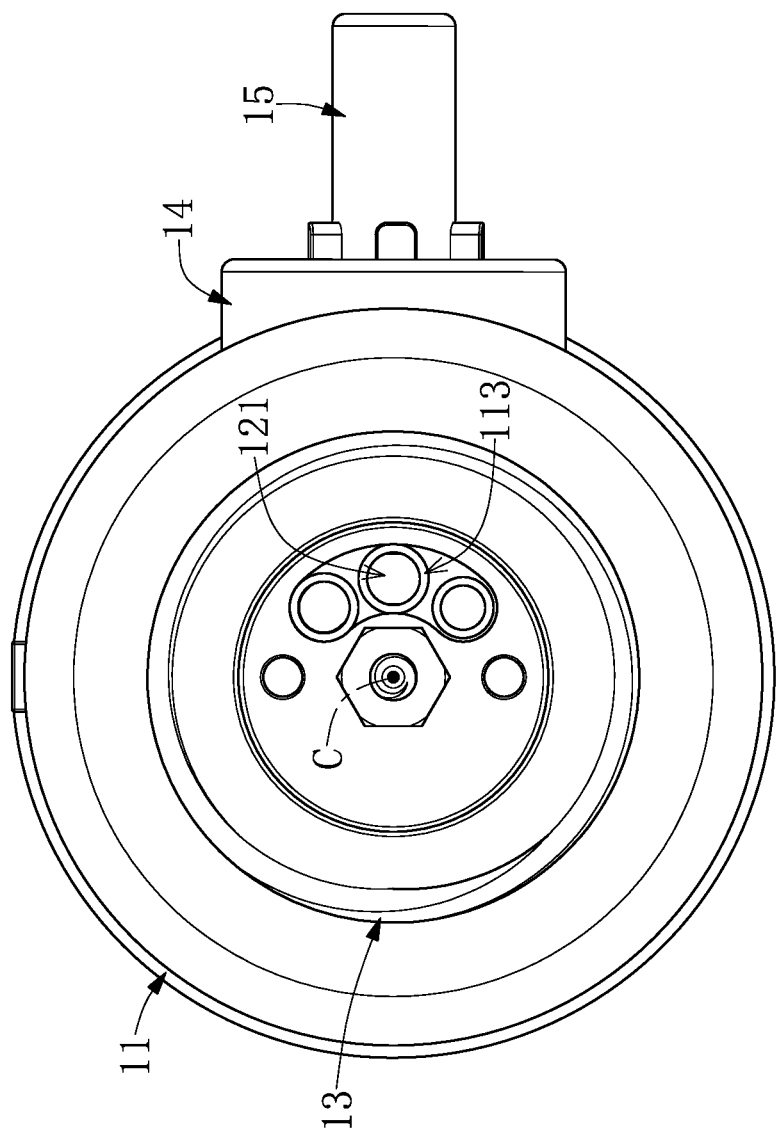
FIG. 3 is a bottom view of FIG. 1.
Figure 4:
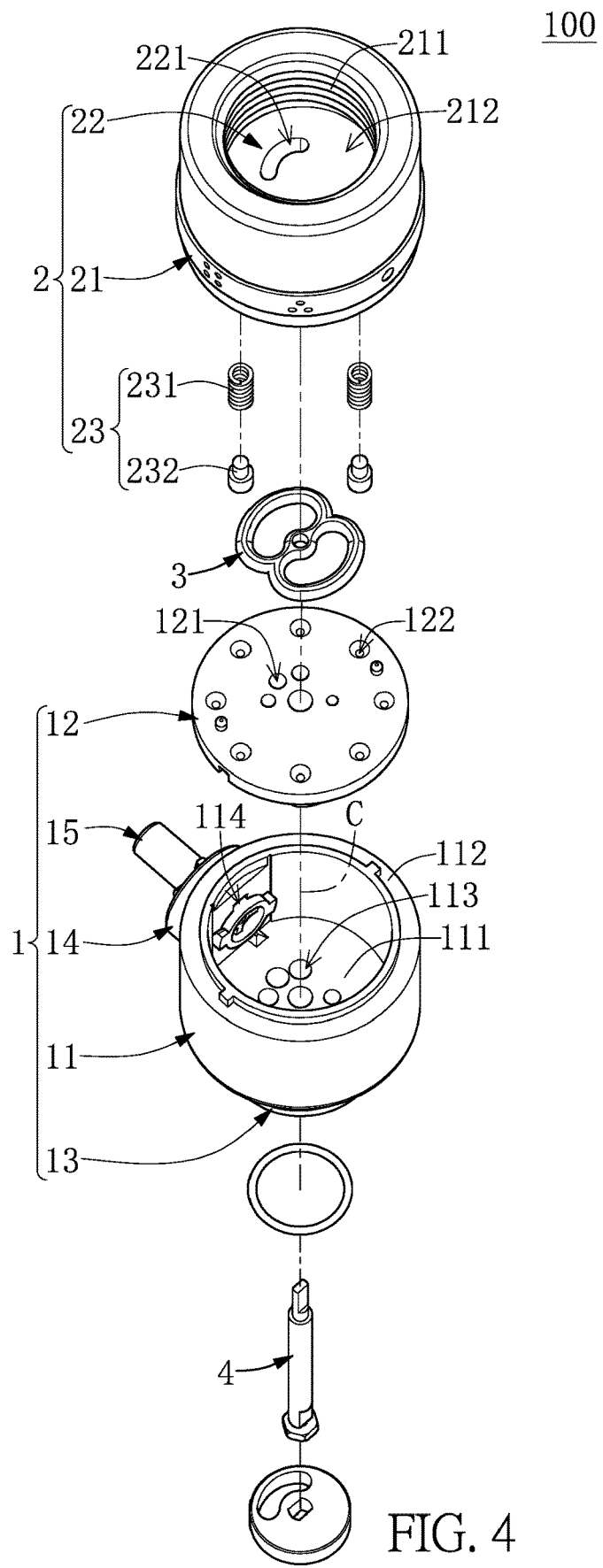
FIG. 4 is an exploded view of FIG. 1.
Figure 5:
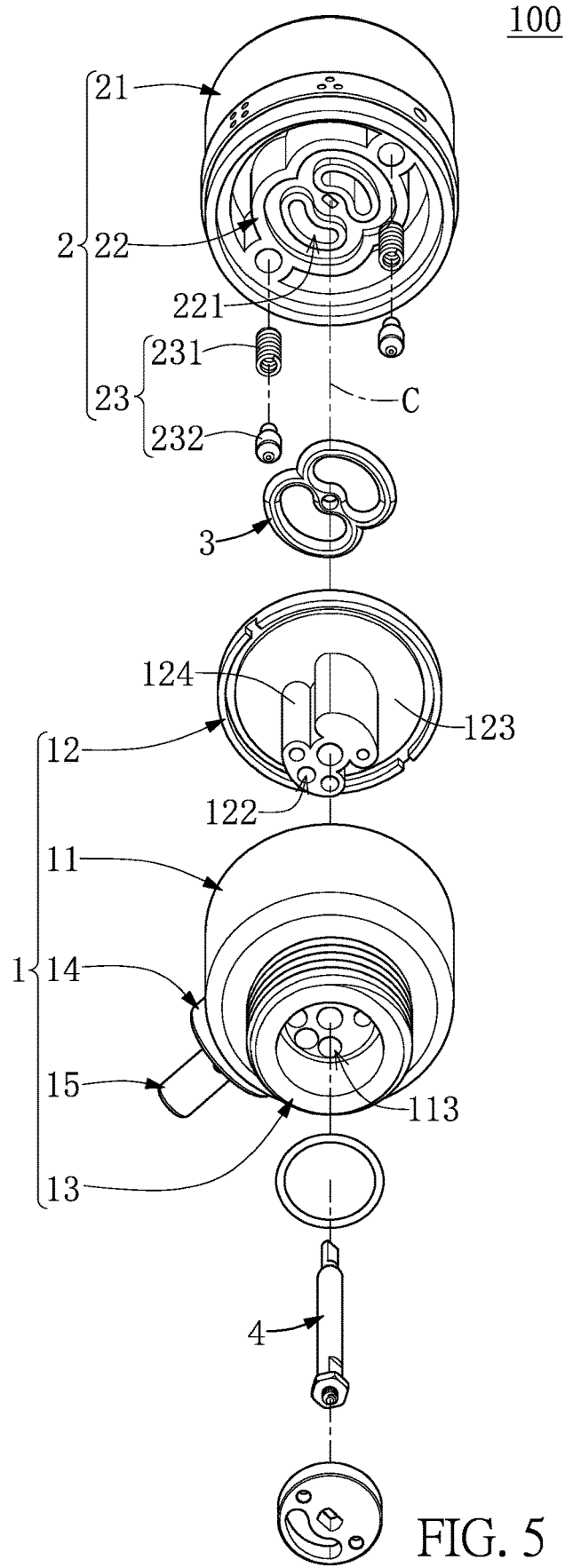
FIG. 5 is an exploded view of FIG. 1 from another angle of view.

Referring to FIG. 1 to FIG. 15, an embodiment of the present disclosure provides an adjustable Venturi tube 100. As shown in FIG. 1 to FIG. 3, the adjustable Venturi tube 100 in the present embodiment can be in cooperation with an ozone generator (not shown in the drawings), but the present disclosure is not limited thereto. For example, the adjustable Venturi tube 100 can be applied to an environment or an apparatus that does not have any ozone generator.

As shown in FIG. 4 to FIG. 7 of the present embodiment, the adjustable Venturi tube 100 includes a water outlet segment 1, a water inlet segment 2, an inner gasket 3 arranged (or sandwiched) between the water outlet segment 1 and the water inlet segment 2, and a fixing rod 4 that is assembled to the water outlet segment 1 and the water inlet segment 2, but the present disclosure is not limited thereto. For example, in other embodiments of the present disclosure, the fixing rod 4 can be omitted or can be replaced by other components (e.g., the water outlet segment 1 and the water inlet segment 2 are formed with structures engaged with each other for replacing the fixing rod 4). The following description describes the structure and connection relationship of each component of the adjustable Venturi tube 100.

The water outlet segment 1 has a gas inlet space S therein, and the water outlet segment 1 includes a chamber 11, a water flow selector 12 disposed on the chamber 11, a water outlet pipe 13 and a gas inlet pipe 14 respectively connected to different sides of the chamber 11, and a check valve 15 that is assembled in the gas inlet pipe 14. The gas inlet space S in the present embodiment is surrounded (or defined) by the chamber 11 and the water flow selector 12, but the present disclosure is not limited thereto. For example, in other embodiments of the present disclosure, the gas inlet space S can be only surrounded (or defined) by the chamber 11.

Moreover, the chamber 11 has a bottom wall 111 and a surrounding lateral wall 112 that is connected to a peripheral edge of the bottom wall 111. The bottom wall 111 has a plurality of liquid-gas exits 113 penetrating therethrough and being in spatial communication with the gas inlet space S. The surrounding lateral wall 112 has a gas inlet opening 114 penetrating therethrough and being in spatial communication with the gas inlet space S. In other words, the gas inlet space S can be in spatial communication with an external space through the liquid-gas exits 113 and the gas inlet opening 114.

Specifically, the surrounding lateral wall 112 is substantially in an annular shape, and defines an axis C perpendicular to the bottom wall 111. The liquid-gas exits 113 are spaced apart from each other, and each of centers of the liquid-gas exits 113 is spaced apart from the axis C by the same distance. In the present embodiment, the liquid-gas exits 113 are arranged in a circular sector of the bottom wall 111 that has an angle equal to or less than 120 degrees with respect to the axis C, and the liquid-gas exits 113 have different inner diameters, but the present disclosure is not limited thereto.

The water flow selector 12 is detachably assembled to the surrounding lateral wall 112 and is arranged in a region surrounded by the bottom wall 111 and the surrounding lateral wall 112, but the water flow selector 12 cannot be rotated relative to the chamber 11. In other words, the water flow selector 12, the bottom wall 111, and the surrounding lateral wall 112 in the present embodiment jointly and surroundingly define the gas inlet space S.

Specifically, the water flow selector 12 has a plurality of selective channels 121 respectively corresponding in position to (or facing toward) the liquid-gas exits 113 along a direction parallel to the axis C. Each of the selective channels 121 is spaced apart from the corresponding liquid-gas exit 113 and is in spatial communication with the gas inlet space S, and an inner diameter of each of the selective channels 121 is less than an inner diameter of the corresponding liquid-gas exit 113. Moreover, the water flow selector 12 has a plurality of positioning slots 122 arranged at an outer side of the selective channels 121. Each of the positioning slots 122 is not in spatial communication with the gas inlet space S, and each of the positioning slots 122 is spaced apart from the axis C by the same distance.

In the present embodiment, the water flow selector 12 includes a plate 123 assembled to the surrounding lateral wall 112 and a column 124 that extends from a bottom surface of the plate 123. Each of the selective channels 121 is formed by penetrating through the plate 123 and the column 124, and each of the positioning slots 122 is recessed in a top surface of the plate 123. In other words, a projection region defined by orthogonally projecting the column 124 onto the top surface of the plate 123 is located at an inner side of the positioning slots 122, but the present disclosure is not limited thereto.

Furthermore, in a cross section of the water outlet segment 1 perpendicular to the axis C, the selective channels 121 have different areas, and the area of any one of the selective channels 121 is not equal to a sum of the areas of at least two of the other selective channels 121. However, in the cross section of the water outlet segment 1 of other embodiments of the present disclosure, the areas of the selective channels 121 can be the same, or the area of any one of the selective channels 121 can be equal to a sum of the areas of at least two of the other selective channels 121.

The water outlet pipe 13 is connected to the bottom wall 111, and is configured to be in spatial communication with the gas inlet space S through any one of the liquid-gas exits 113 and the corresponding selective channel 121. Moreover, an outer surface of the water outlet pipe 13 is in a shape of a screw and used for being detachably assembled to a matching water pipe (not shown in the drawings).

The gas inlet pipe 14 is connected to the surrounding lateral wall 112, and is in spatial communication with the gas inlet space S through the gas inlet opening 114. The bottom wall 111 and the surrounding lateral wall 112 of the chamber 11, the water outlet pipe 13, and the gas inlet pipe 14 in the present embodiment are integrally formed as a single one-piece structure, but the present disclosure is not limited thereto. For example, in other embodiments of the present disclosure, the bottom wall 111 and the surrounding lateral wall 112 of the chamber 11 and the water outlet pipe 13 can be integrally formed as a single one-piece structure, and the gas inlet pipe 14 is detachably assembled to the surrounding lateral wall 112.

Moreover, the check valve 15 is assembled in the gas inlet pipe 14 and is configured to be connected to the ozone generator, so that gas generated from the ozone generator can flow into the gas inlet space S through the check valve 15, and the check valve 15 can be used to prevent gas or liquid in the gas inlet space S from flowing toward the ozone generator.

The water inlet segment 2 includes a pipe body 21, an adjusting portion 22 connected to the pipe body 21, and a plurality of positioning assemblies 23. An end portion of the fixing rod 4 is fixed to the adjusting portion 22 of the water inlet segment 2, and the other portion of the fixing rod 4 passes through (or is inserted into) the inner gasket 3, the water flow selector 12, and the chamber 11, so that the water inlet segment 2 can be rotatable along the axis C relative to the water outlet segment 1.

Specifically, a central line of the pipe body 21 is overlapped with the axis C, and an outer surface of the pipe body 21 is preferably flush with an outer surface of the surrounding lateral wall 112 of the chamber 11, but the present disclosure is not limited thereto. Moreover, a top portion of the pipe body 21 (e.g., an upper half portion of the pipe body 21 shown in FIG. 6) has a screwing portion 211 arranged on an inner side thereof for being connected to a water source (e.g., a water pipe connected to a faucet), so that water from the water source can flow through the adjustable Venturi tube 100 by sequentially passing through the water inlet segment 2 and the water outlet segment 1.

Figure 6:
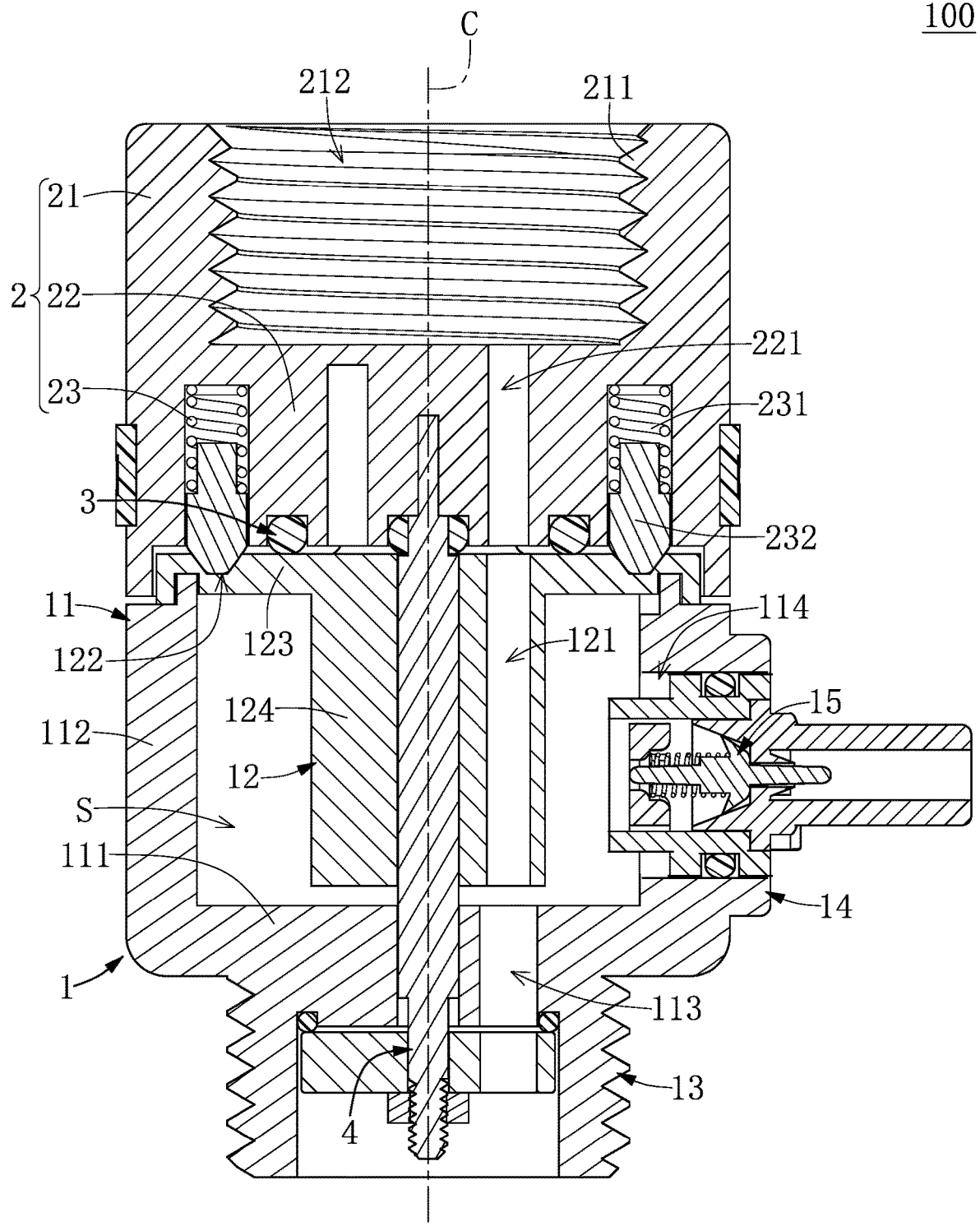
FIG. 6 is a cross-sectional view taken along line VI-VI of FIG. 2.
Figure 7:
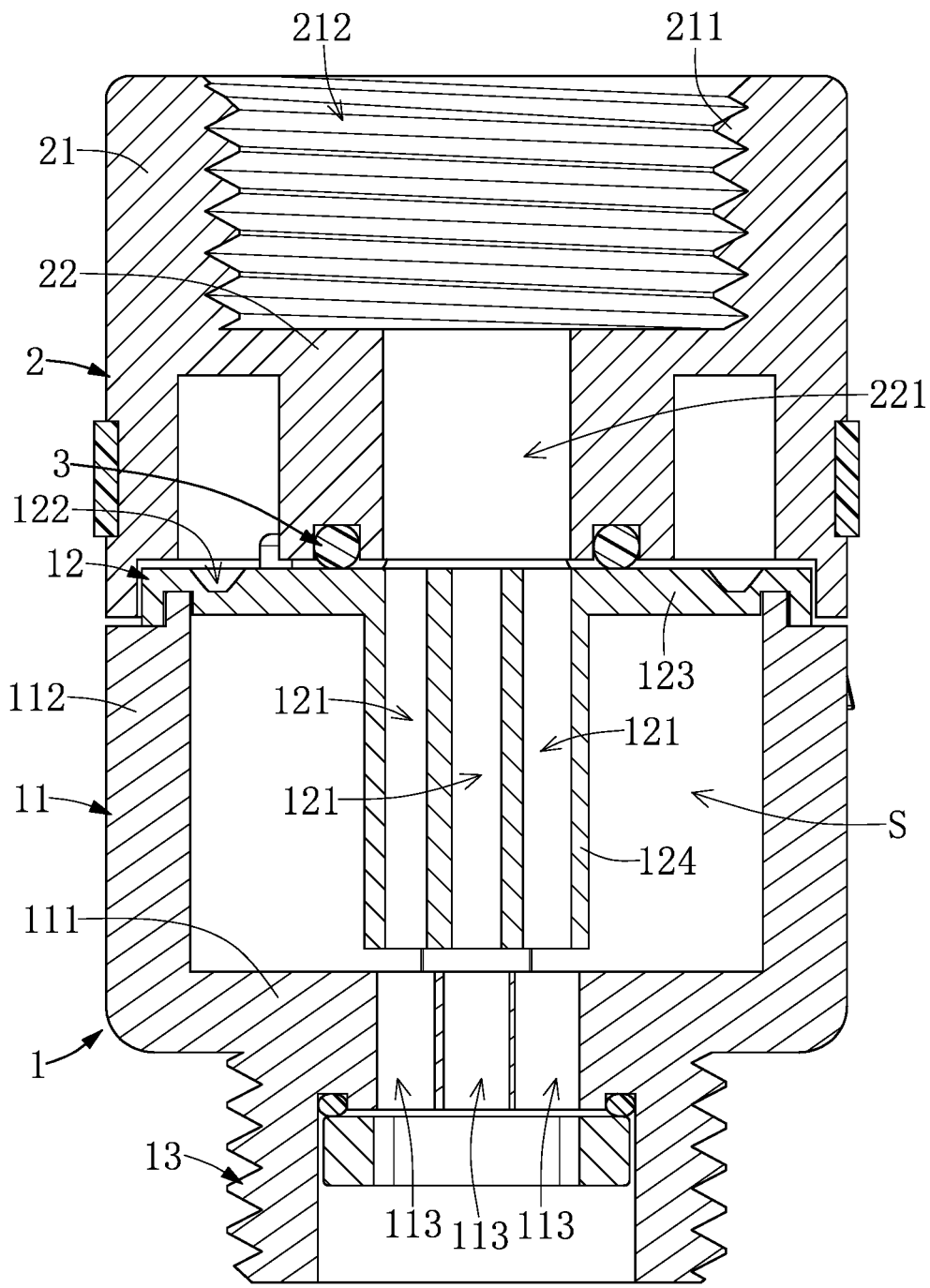
FIG. 7 is a cross-sectional view taken along line VII-VII of FIG. 2.
Figure 8:
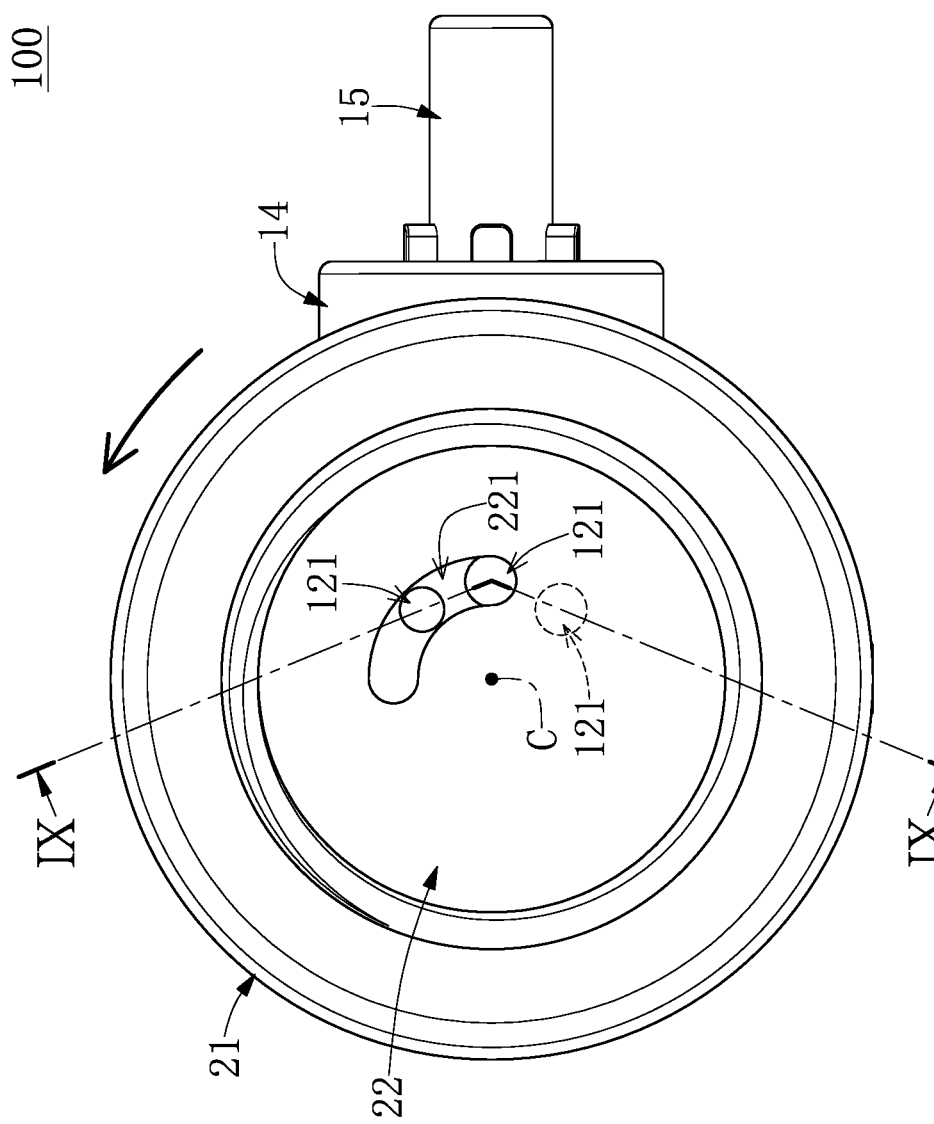
FIG. 8 is a top view showing the adjustable Venturi tube of FIG. 2 after a water inlet segment is rotated along a counterclockwise direction relative to a water outlet segment.
Figure 9:
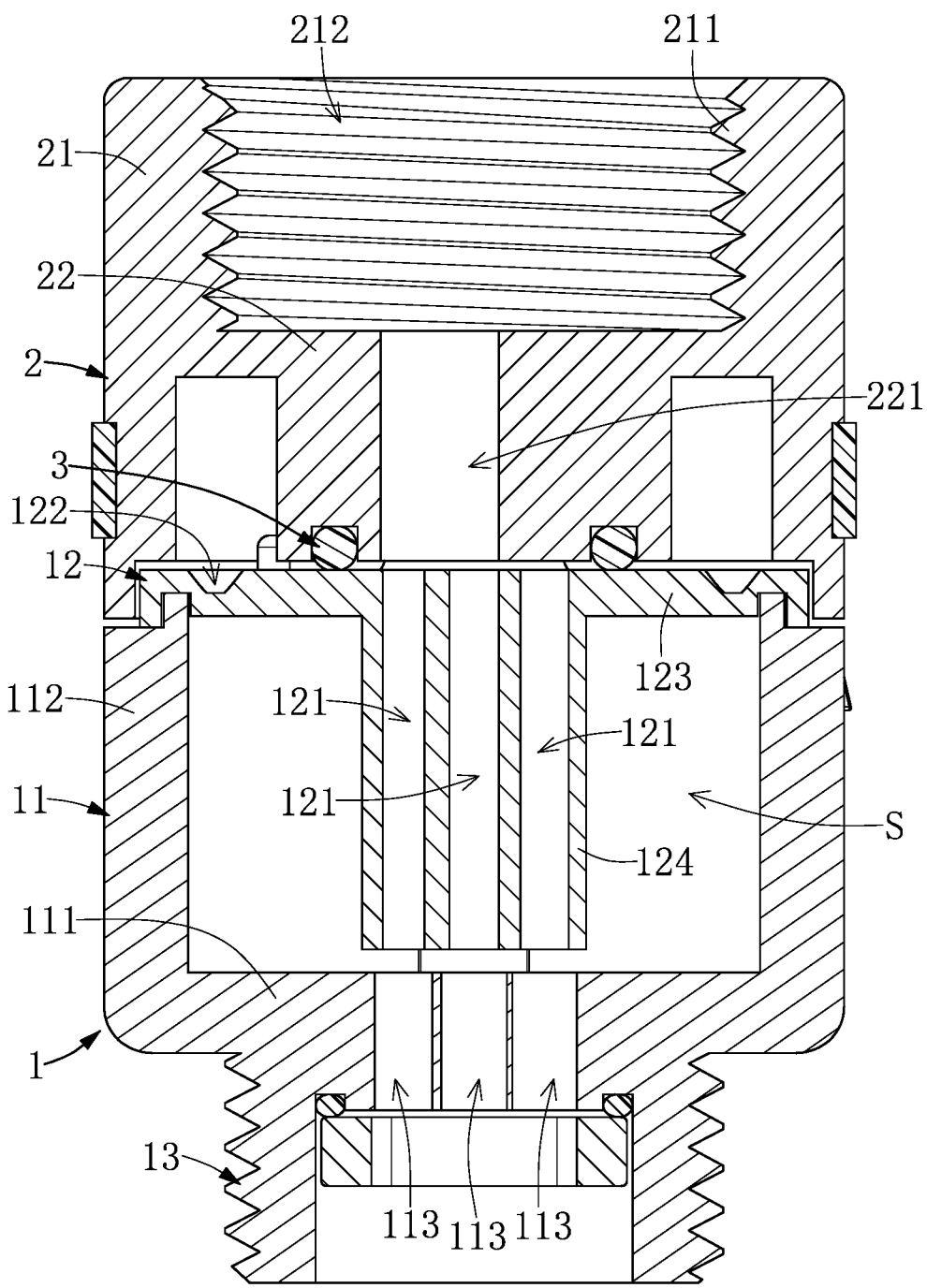
FIG. 9 is a cross-sectional view taken along line IX-IX of FIG. 8.
Figure 10:
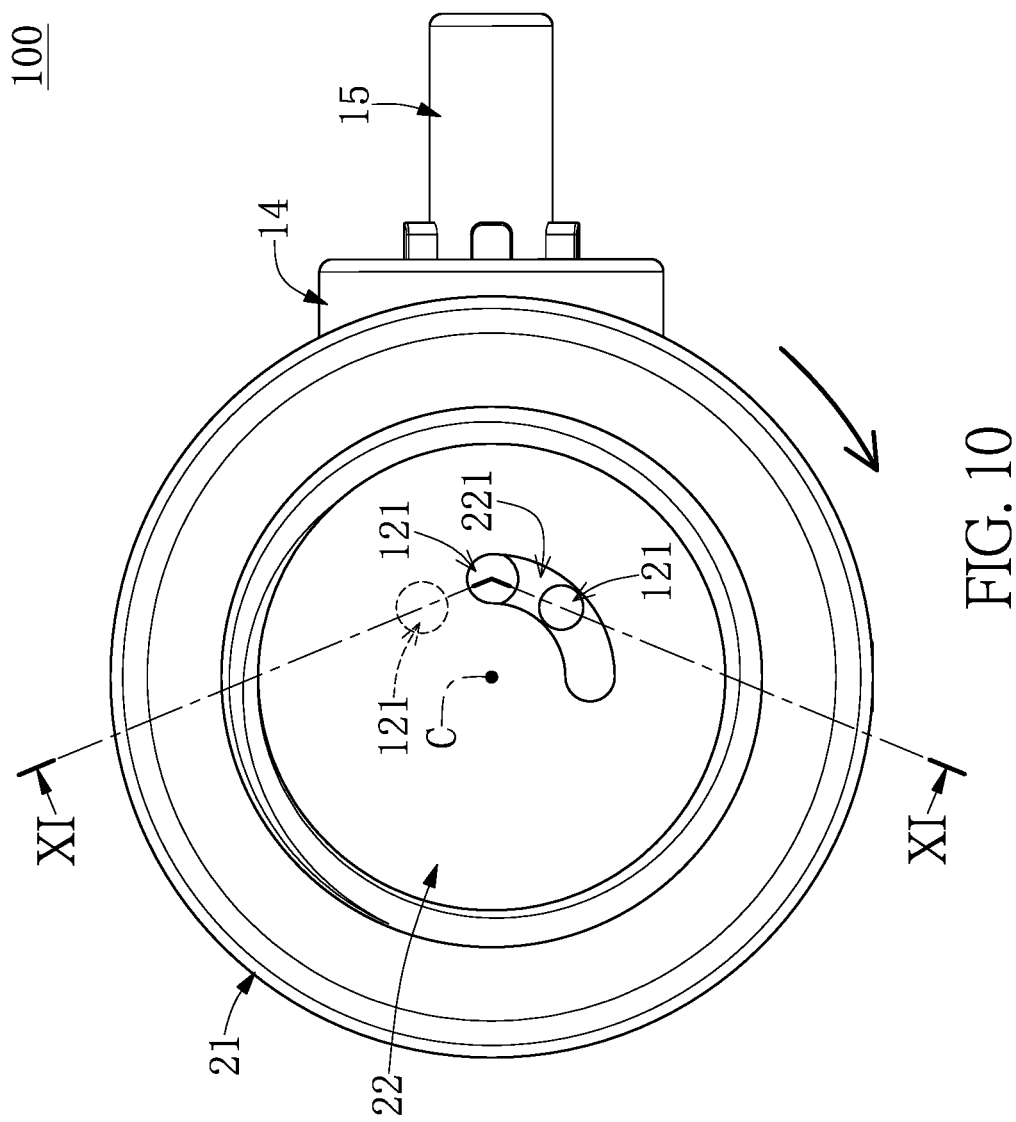
FIG. 10 is a top view showing the adjustable Venturi tube of FIG. 2 after the water inlet segment is rotated along a clockwise direction relative to the water outlet segment.
Figure 11:
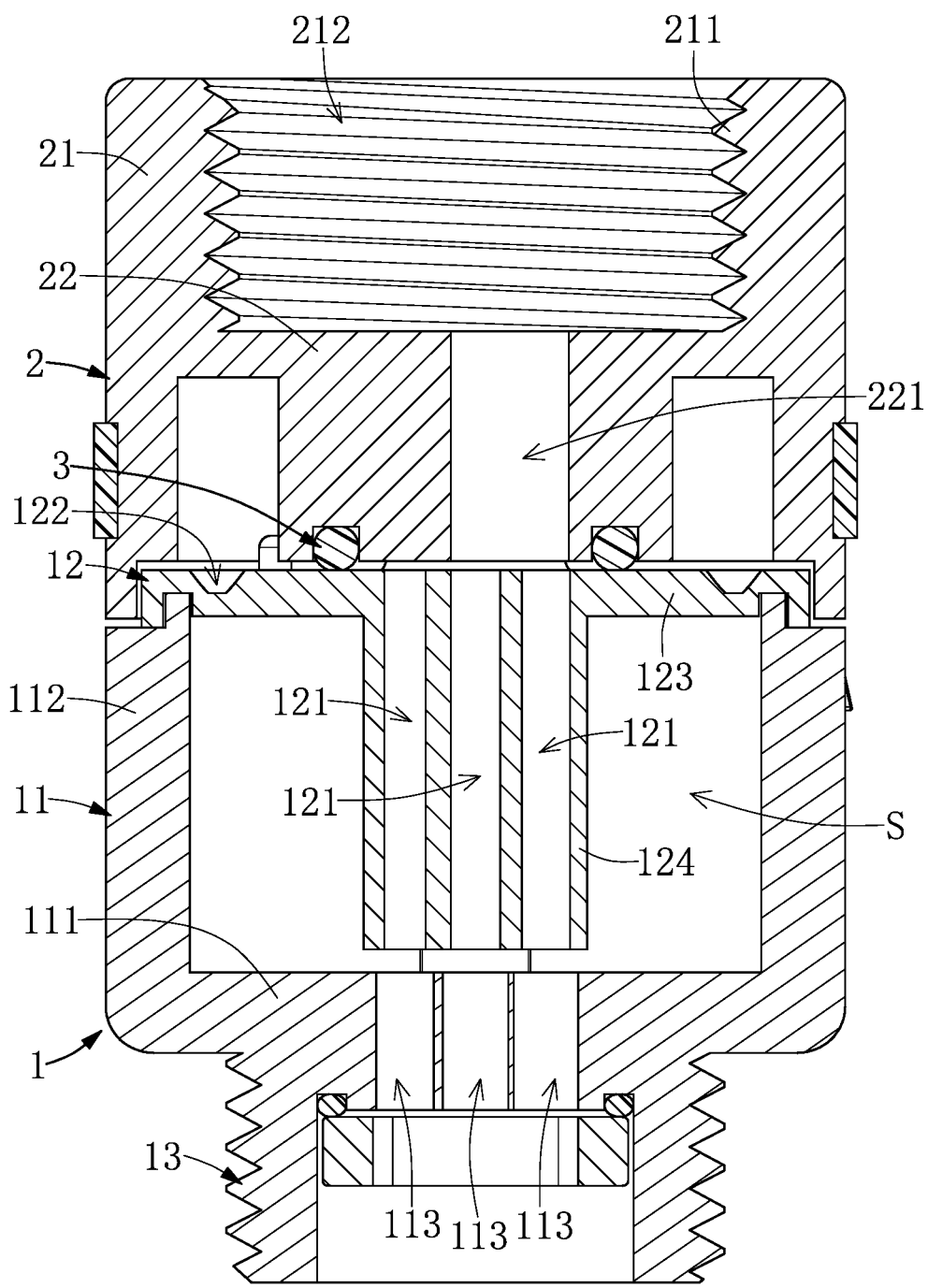
FIG. 11 is a cross-sectional view taken along line XI-XI of FIG. 10.
Figure 12:
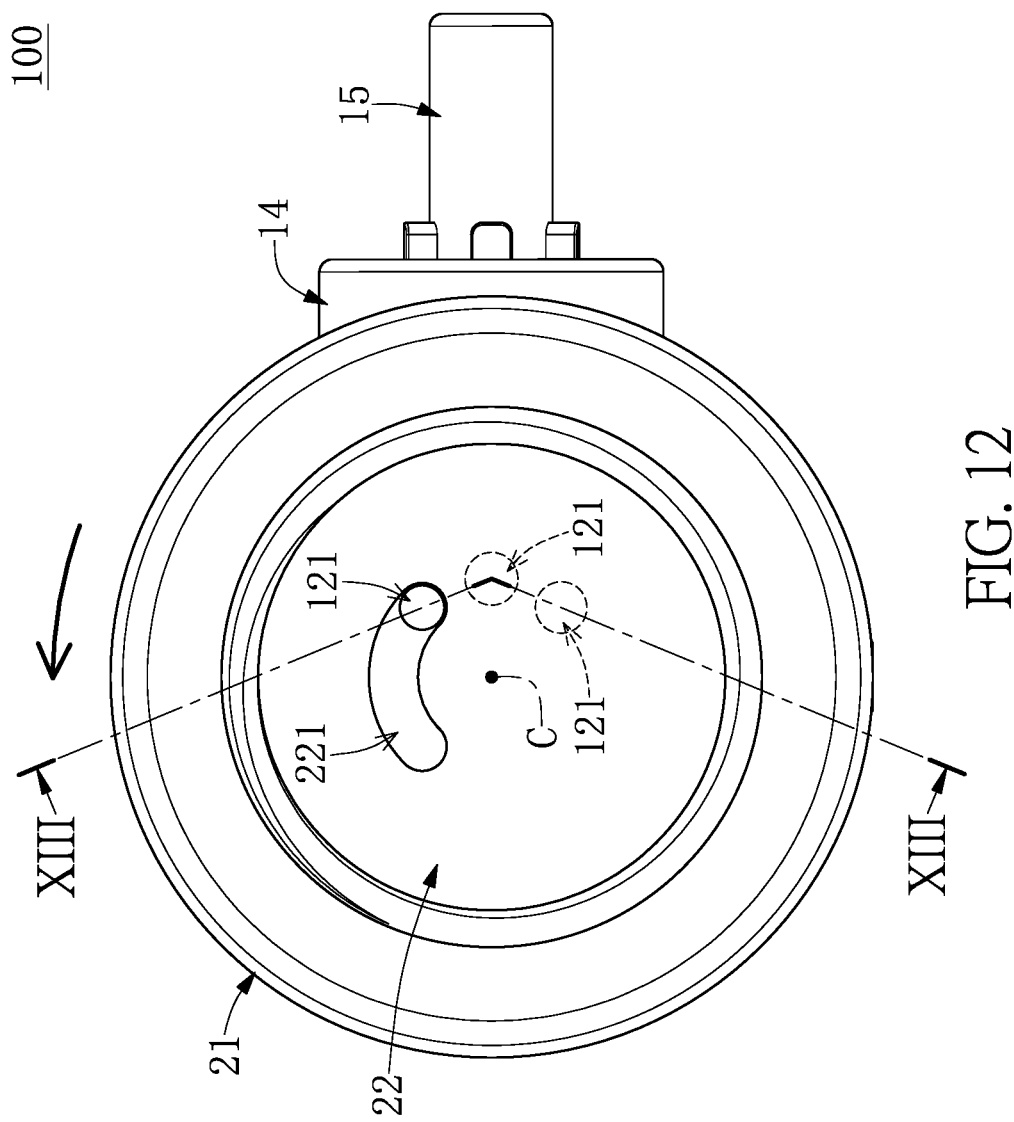
FIG. 12 is a top view showing the adjustable Venturi tube of FIG. 8 after the water inlet segment is rotated along the counterclockwise direction relative to the water outlet segment.
Figure 13:
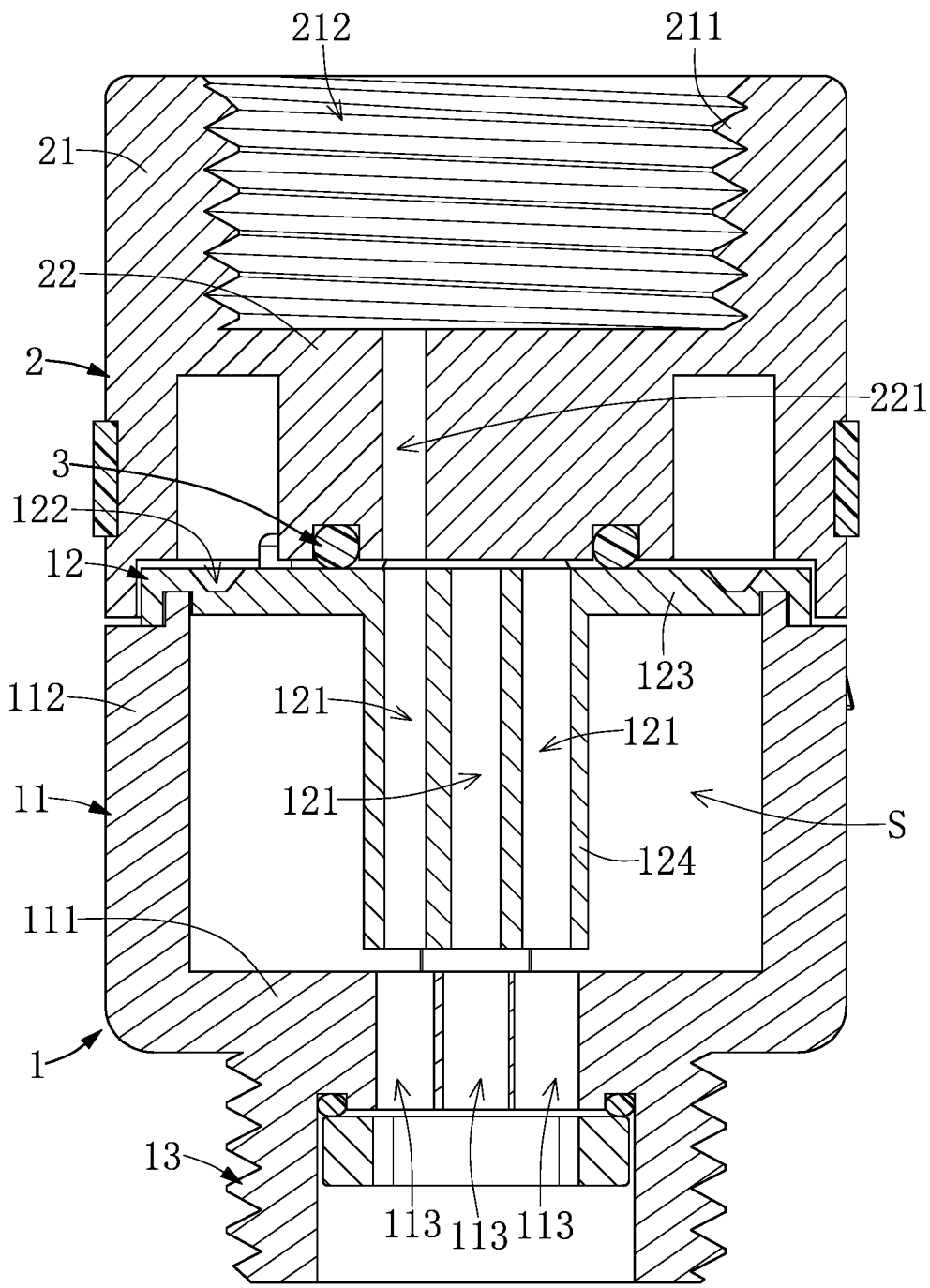
FIG. 13 is a cross-sectional view taken along line XIII-XIII of FIG. 12.
Figure 14:
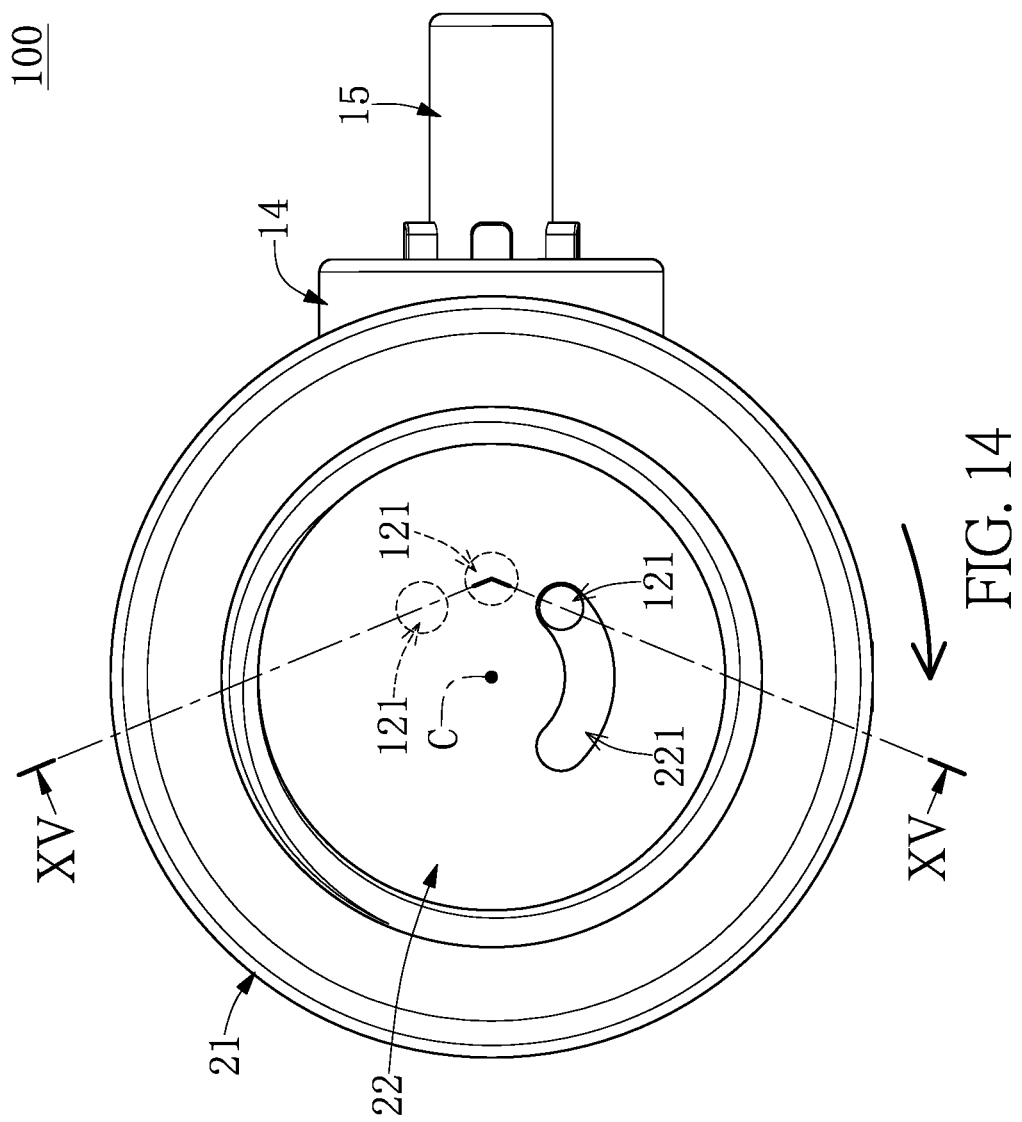
FIG. 14 is a top view showing the adjustable Venturi tube of FIG. 10 after the water inlet segment is rotated along the clockwise direction relative to the water outlet segment.
Figure 15:
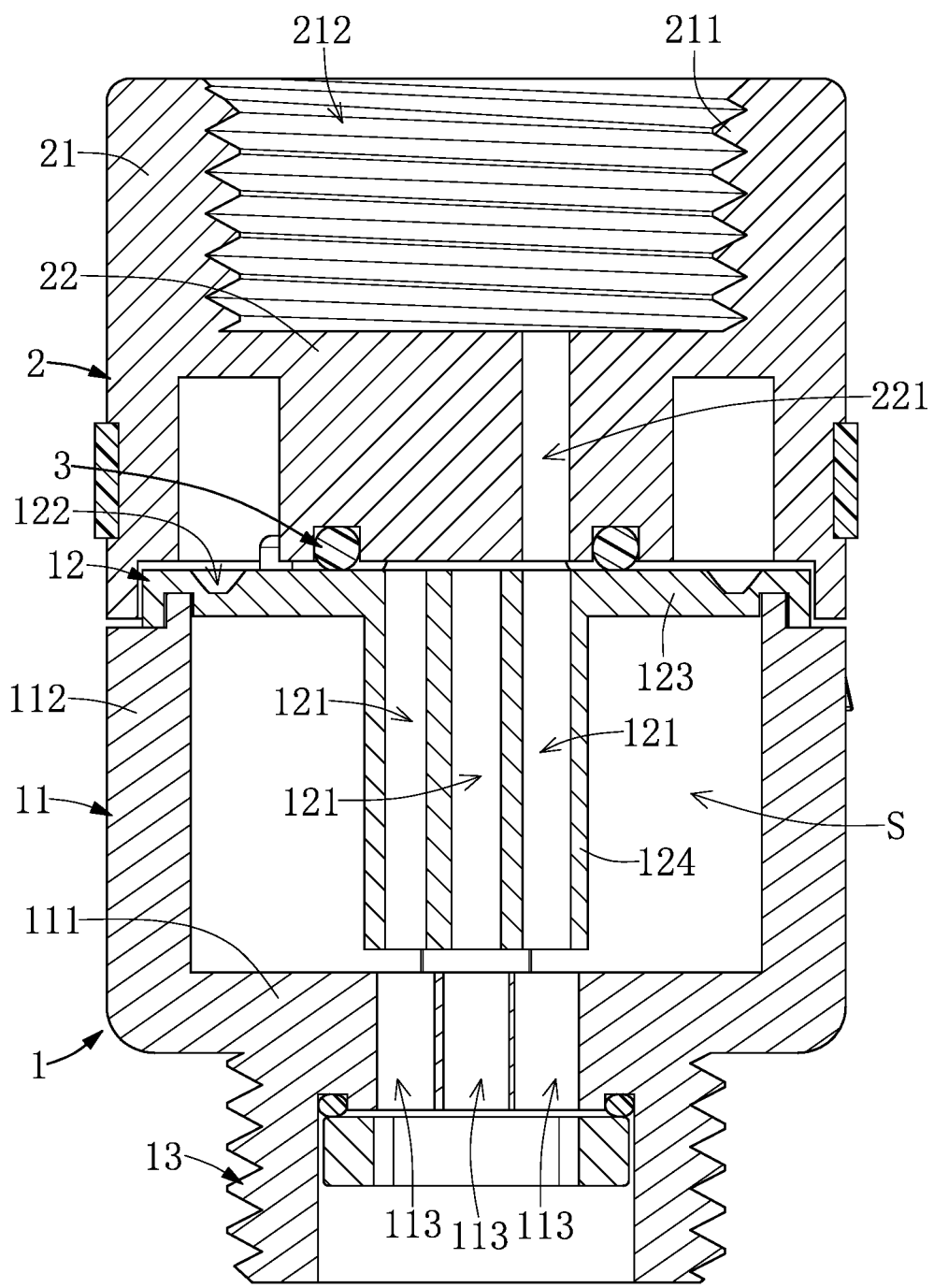
FIG. 15 is a cross-sectional view taken along line XV-XV of FIG. 14.

The adjusting portion 22 is connected to an inner side of a bottom of the pipe body 21 (e.g., a lower half portion of the pipe body 21 shown in FIG. 6). The adjusting portion 22 has a water channel 221, and a projection region defined by orthogonally projecting the water channel 221 onto the water outlet segment 1 is preferably overlapped with all of the selective channels 121. Moreover, a cross section of the water channel 221 perpendicular to the axis C in the present embodiment is in a shape of an arc having a center of circle located at the axis C, but the present disclosure is not limited thereto. For example, in other embodiments of the present disclosure, the arced cross section can belong to a part of the water channel 221.

Furthermore, the adjusting portion 22 is rotatable along the axis C by being pivotally connected to the water flow selector 12, so that the water inlet segment 2 is rotatable relative to the water outlet segment 1 to allow the water inlet segment 2 and the water flow selector 12 to be moved relative to each other. In the present embodiment, the positioning assemblies 23 are assembled to at least one of the adjusting portion 22 and the pipe body 21 and respectively correspond in position to (or respectively face toward) the positioning slots 122, so that each of the positioning assemblies 23 is engaged with and elastically abutted against the corresponding positioning slot 122.

Specifically, any one of the positioning assemblies 23 in the present embodiment includes a compression spring 231 and an abutting pillar 232 that is connected to the compression spring 231, but the present disclosure is not limited thereto. In any one of the positioning assemblies 23, the compression spring 231 is disposed in at least one of the adjusting portion 22 and the pipe body 21, and a part of the abutting pillar 23 is engaged with and elastically abutted against the corresponding positioning slot 122.

Accordingly, the adjustable Venturi tube 100 in the present embodiment allows the water inlet segment 2 to be located at different positions with respect to the water outlet segment 1 by the cooperation between the positioning assemblies 23 and the positioning slots 122.

Specifically, the adjusting portion 22 in the present embodiment is in spatial communication with a space 212 surrounded by (or defined by) the screwing portion 211 only through the water channel 221. The water inlet segment 2 and the water flow selector 12 are configured to be moved relative to each other so as to allow the space 212 surrounded by the screwing portion 211 to selectively be in spatial communication with at least one of the selective channels 121 through the water channel 221. For example, as shown in FIG. 8 to FIG. 11, the space 212 can be in spatial communication with only one of the selective channels 121 through the water channel 221, selectively.

In other words, the water inlet segment 2 and the water flow selector 1 can be moved relative to each other so as to allow the space 212 surrounded by the screwing portion 211 to selectively be in spatial communication with at least two of the selective channels 121 through the water channel 221. For example, as shown in FIG. 12 to FIG. 15, the space 212 can be in spatial communication with two of the selective channels 121 through the water channel 221, selectively; or the space 212 can be in spatial communication with three of the selective channels 121 through the water channel 221, selectively.

Accordingly, since the adjustable Venturi tube 100 is formed with a specific structural design (e.g., the selective cooperation of the water channel 221 and the selective channels 121), the adjustable Venturi tube 100 under an environment with different water pressures can be maintained to intake gas by selecting a quantity of the selective channels 121 cooperated with the water channel 221. Moreover, the adjustable Venturi tube 100 allows different water flows to pass therethrough so as to have a multi-flow adjustment function for satisfying environments with different water flows or different gas flows.

In addition, the inner gasket 3 is sandwiched between the water flow selector 12 of the water outlet segment 1 and the adjusting portion 22 of the water inlet segment 2. The inner gasket 3 is fixed to the adjusting portion 22 and surrounds the water channel 221, and the inner gasket 3 is gaplessly abutted against the water flow selector 12, so that the water channel 221 and the selective channels 121 can be maintained to be sealed with each other. In the present embodiment, the inner gasket 3 is integrally formed as a single one-piece structure, and the inner gasket 3 is in a two-fold rotational symmetry with respect to the axis C, but the present disclosure is not limited thereto.

It should be noted that the chamber 11 of the water outlet segment 1 and the pipe body 21 of the water inlet segment 2 in the present embodiment are two components separated from each other, but the present disclosure is not limited thereto. For example, in other embodiments of the present disclosure, the chamber 11 of the water outlet segment 1 and the pipe body 21 of the water inlet segment 2 can be integrally formed as a single one-piece structure, and the water flow selector 12 is rotatably assembled to at least one of the chamber 11 and the pipe body 21, so that the water flow selector 12 can be rotated relative to the chamber 11 and the pipe body 21 for allowing the space 212 surrounded by the screwing portion 211 to selectively be in spatial communication with at least one of the selective channels 121 through the water channel 221.

In conclusion, since the adjustable Venturi tube of the present disclosure is formed with a specific structural design (e.g., the selective cooperation of the water channel and the selective channels), the adjustable Venturi tube under an environment with different water pressures can be maintained to intake gas by selecting a quantity of the selective channels cooperated with the water channel. Moreover, the adjustable Venturi tube of the present disclosure allows different water flows to pass therethrough so as to have a multi-flow adjustment function for satisfying environments with different water flows or different gas flows.

Specifically, the multi-flow adjustment function of the adjustable Venturi tube can be further improved by having detail structural designs (e.g., the selective channels have different areas, and the area of any one of the selective channels is not equal to a sum of the areas of at least two of the other selective channels; each of centers of the liquid-gas exits is spaced apart from the axis by the same distance, and the liquid-gas exits are arranged in a circular sector of the bottom wall that has an angle equal to or less than 120 degrees with respect to the axis; and the water flow selector has a plurality of positioning slots arranged at an outer side of the selective channels, the water inlet segments includes a plurality of positioning assemblies respectively corresponding in position to the positioning slots, and each of the positioning assemblies is engaged with and elastically abutted against the corresponding positioning slot).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adjustable Venturi tube, comprising:
    a water outlet segment including:
        a water flow selector having a plurality of selective channels;
        a chamber having a bottom wall and a surrounding lateral wall connected to the bottom wall, wherein the water flow selector is disposed on the chamber, and the water outlet segment has a gas inlet space therein, wherein the surrounding lateral wall has a gas inlet opening that is in spatial communication with the gas inlet space, and the bottom wall has a plurality of liquid-gas exits respectively corresponding in position to the selective channels, and wherein each of the selective channels is spaced apart from the corresponding liquid-gas exit and is in spatial communication with the gas inlet space, and an inner diameter of each of the selective channels is less than an inner diameter of the corresponding liquid-gas exit;
        a water outlet pipe connected to the bottom wall, wherein the water outlet pipe is configured to be in spatial communication with the gas inlet space through any one of the liquid-gas exits and the corresponding selective channel; and
        a gas inlet pipe connected to the surrounding lateral wall, wherein the gas inlet pipe is in spatial communication with the gas inlet space through the gas inlet opening;
    a water inlet segment including:
        a pipe body having a screwing portion arranged on an inner side of a top portion thereof; and
        an adjusting portion connected to an inner side of a bottom portion of the pipe body and having a water channel, wherein the water inlet segment and the water flow selector are configured to be moved relative to each other so as to allow a space surrounded by the screwing portion to selectively be in spatial communication with at least one of the selective channels through the water channel; and
    an inner gasket fixed to the adjusting portion and surrounding the water channel, wherein the inner gasket gaplessly abuts against the water flow selector.

2. The adjustable Venturi tube according to claim 1, wherein the water flow selector, the bottom wall, and the surrounding lateral wall jointly and surroundingly define the gas inlet space, and wherein the adjusting portion is rotatable along an axis by being pivotally connected to the water flow selector, so that the water inlet segment is rotatable relative to the water outlet segment to allow the water inlet segment and the water flow selector to be moved relative to each other.

3. The adjustable Venturi tube according to claim 2, wherein each of centers of the liquid-gas exits is spaced apart from the axis by the same distance, and the liquid-gas exits are arranged in a circular sector of the bottom wall that has an angle equal to or less than 120 degrees with respect to the axis.

4. The adjustable Venturi tube according to claim 2, wherein the water inlet segment and the water outlet segment are configured to be moved relative to each other so as to allow the space surrounded by the screwing portion to selectively be in spatial communication with at least two of the selective channels through the water channel.

5. The adjustable Venturi tube according to claim 4, wherein, in a cross section of the water outlet segment perpendicular to the axis, the selective channels have different areas, and the area of any one of the selective channels is not equal to a sum of the areas of at least two of the remaining selective channels.

6. The adjustable Venturi tube according to claim 2, wherein the inner gasket is integrally formed as a single one-piece structure, and the inner gasket is in a two-fold rotational symmetry with respect to the axis.

7. The adjustable Venturi tube according to claim 2, wherein a cross section of the water channel perpendicular to the axis is in a shape of an arc having a center of circle located at the axis.

8. The adjustable Venturi tube according to claim 2, wherein the bottom wall and the surrounding lateral wall of the chamber and the water outlet pipe are integrally formed as a single one-piece structure, and the water flow selector is detachably assembled to the surrounding lateral wall and is arranged in a region surrounded by the bottom wall and the surrounding lateral wall.

9. The adjustable Venturi tube according to claim 8, further comprising a fixing rod that passes through the inner gasket, the water flow selector, and the chamber along the axis.

10. The adjustable Venturi tube according to claim 8, wherein the water flow selector has a plurality of positioning slots arranged at an outer side of the selective channels, the water inlet segments includes a plurality of positioning assemblies respectively corresponding in position to the positioning slots, and each of the positioning assemblies engages with and elastically abuts against the corresponding positioning slot.

\* \* \* \* \*